United States Patent [19]

Chester

[11] Patent Number: 5,142,595
[45] Date of Patent: Aug. 25, 1992

[54] MICROWAVE SYSTEM EMPLOYING OPTICALLY PHASED CONFORMAL ANTENNAS HAVING PHOTONIC INTERCONNECTS AND METHOD OF FORMING PHOTONIC INTERCONNECTS

[75] Inventor: Arthur N. Chester, Malibu, Calif.

[73] Assignee: Hughes Aircraft Company, Los Angeles, Calif.

[21] Appl. No.: 779,785

[22] Filed: Oct. 21, 1991

[51] Int. Cl.$^5$ .......................... G02B 6/34; H04B 7/00; H01P 5/12; H01Q 1/06

[52] U.S. Cl. ...................................... 385/37; 385/14; 385/49; 385/3; 385/89; 385/115; 342/367; 359/130; 359/173; 333/117; 343/721

[58] Field of Search ............... 385/2, 3, 10, 14, 37, 385/49, 88, 89, 114, 115; 342/368, 367; 359/130, 173; 333/113, 117; 343/720, 721, 781 R; 250/227.11

[56] References Cited

U.S. PATENT DOCUMENTS

| | | | |
|---|---|---|---|
| 3,878,520 | 4/1975 | Wright et al. | 342/368 X |
| 4,468,766 | 8/1984 | Spezio | 359/130 |
| 4,583,096 | 4/1986 | Bellman et al. | 342/368 |
| 4,593,969 | 6/1986 | Goodman et al. | 385/37 |
| 4,814,774 | 3/1989 | Herczfeld | 342/368 X |
| 4,864,310 | 9/1989 | Bernard et al. | 342/368 |
| 4,885,589 | 12/1989 | Edward et al. | 342/368 |
| 4,961,617 | 10/1990 | Shahidi et al. | 385/114 |
| 5,058,977 | 10/1991 | Sorin | 385/37 |
| 5,076,655 | 12/1991 | Bridges | 385/2 X |
| 5,077,816 | 12/1991 | Glomb et al. | 385/37 |

*Primary Examiner*—Brian Healy
*Attorney, Agent, or Firm*—V. D. Duraiswamy; P. M. Coble; W. K. Denson-Low

[57] ABSTRACT

An optically phased conformal antenna and photonic interconnect therefor that may be used in such microwave systems. Rows of microwave circuits are disposed on top of a cooling arrangement disposed on a curved surface. An optical ribbon cable disposed on top of the microwave circuits is employed to couple signals to the microwave circuits. Microwave antennas are disposed on top of the optical ribbon cable which has windows therein that permit welding of the antennas to the appropriate microwave circuits. Optical coupling of signals from the optical cable to the microwave circuits is achieved through the use of diffraction gratings, and the like, formed in the optical cable, in conjunction with laser diodes and detectors disposed on the chips.

18 Claims, 3 Drawing Sheets

MICROWAVE SYSTEM EMPLOYING OPTICALLY PHASED CONFORMAL ANTENNAS HAVING PHOTONIC INTERCONNECTS AND METHOD OF FORMING PHOTONIC INTERCONNECTS

BACKGROUND

The present invention relates generally to microwave systems, and more particularly, to an optically phased conformal antenna and photonic interconnect therefor that may be used in such microwave systems.

Advanced microwave systems such as radars and countermeasures systems require large numbers of individually phased components mounted on surfaces which may not be flat. What is needed is a technique for applying, interconnecting, phasing, and cooling large numbers of microwave integrated circuit chips on curved surfaces. It is most desirable that this technique involve minimum parts count, a minimum number of processing steps, and non-critical assembly tolerances.

Furthermore, optical interconnections between electronic chips can handle wide bandwidths with either minimal time delays, or controlled time delays. However, it is difficult to interface microwave integrated circuit chips with optical fibers. What is needed is a technique for connecting large numbers of microwave integrated circuit chips and fibers with minimum parts count, minimum number of processing steps, and non-critical assembly tolerances, and which is particularly directed to interconnecting the microwave integrated circuit chips.

SUMMARY OF THE INVENTION

In order to provide the above-cited interconnection scheme for use on curved surfaces, the present invention comprises an optically phased conformal antenna and photonic interconnect therefor that may be used in microwave systems. Rows of microwave integrated circuit chips are disposed on top of a cooling arrangement disposed on a curved surface. An optical ribbon cable is disposed on top of the microwave circuits and is employed to couple signals to or from the microwave circuits. Microwave antennas are disposed on top of the optical ribbon cable which has windows therein that permit connection between the antennas and the appropriate microwave integrated circuit chips. Optical coupling of signals from the optical cable to and from the microwave circuits is achieved through the use of diffraction gratings, or the like, formed in the optical cable, in conjunction with laser diodes and detectors disposed on the integrated circuit chips.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
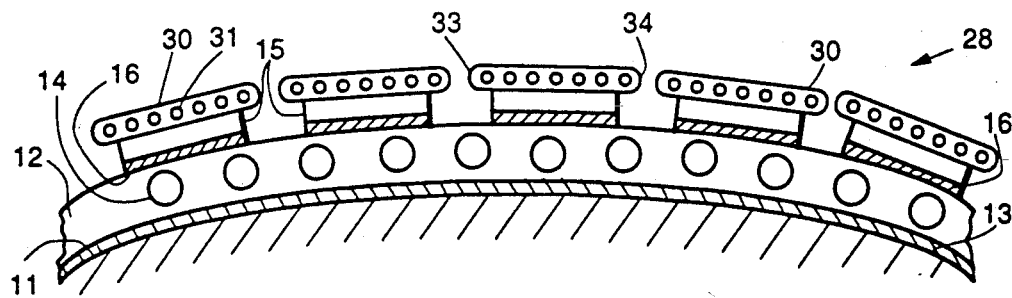
FIG. 1 shows a side cross sectional view of the microwave system in accordance with the principles of the present invention disposed on a convex surface.
Figure 2:
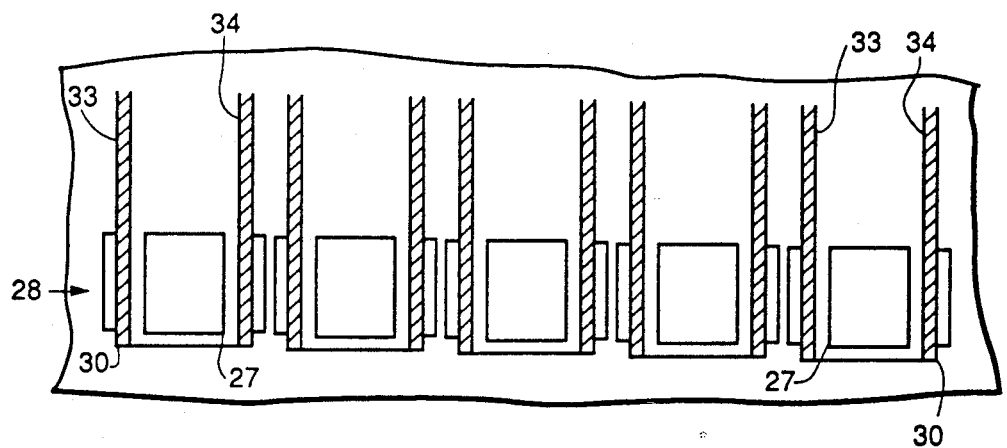
FIG. 2 shows a top view of the microwave system of FIG. 1.
Figure 3:
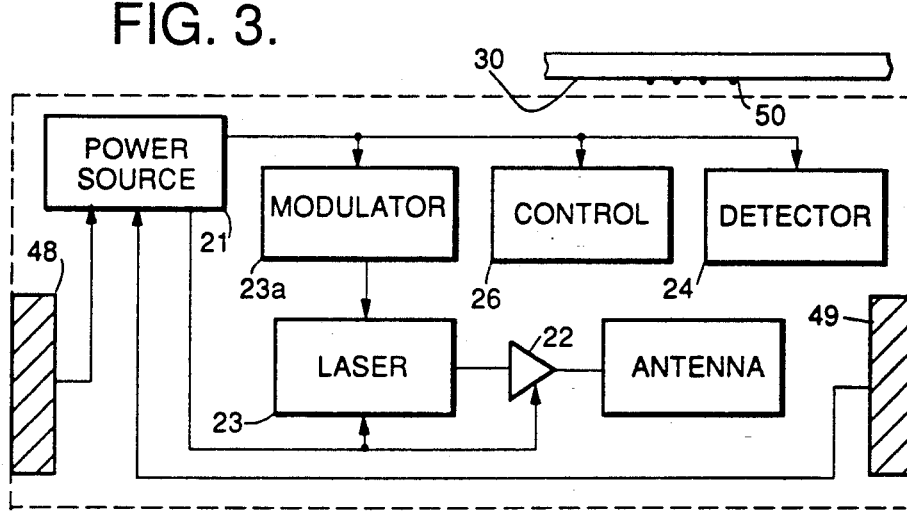
FIG. 3 shows a schematic view representative of a microwave integrated circuit chip employed in the microwave system of FIG. 1.

Referring to the drawing figures, FIG. 1 shows a side cross sectional view of the microwave system 10 in accordance with the principles of the present invention disposed on a portion of a convex surface 11, or aircraft fuselage 11, for example. FIG. 2 shows a top view of the microwave system 10 of FIG. 1, while FIG. 3 shows a schematic view representative of a microwave integrated circuit chip 15 employed in the microwave system 10 of FIG. 1.

It is desired to apply an array 28 of microwave antennas 27 onto the exterior of the fuselage 11. On an inner layer, next to the fuselage 11, a cooling surface 12 is provided. Cooling is achieved through conduction, or by applying a cooling surface 12 containing many parallel tubes 14 through which coolant flows. The cooling surface 12 may be applied using a layer of adhesive 13, for example.

Microwave chips 15, comprising integrated circuit chips adapted to process and control microwave signals, are disposed on top of the cooling surface 12, using thermally conducting adhesive 16, for example. The electronics comprising the microwave chips 15 is shown disposed on a side of each chip 15 distal from the cooling surface 12. However, it is to be understood that the electronics could be disposed on either side, or both sides, of each chip 15, as is well-known in the art. With reference to FIG. 3, a particularly useful microwave chip 15 contains, for example, a microwave power source 21, a microwave power amplifier 22, a laser source 23 that is modulatable using a modulator 23a, an optical detector 24, optical waveguides 25 (shown in FIG. 10), electronic control circuitry 26, and the microwave antenna 27. The microwave chips 15 are typically applied in rows (shown more clearly in in FIG. 2). If the convex surface 11 is not cylindrical, some of the rows may be shorter than others in order to cover the convex surface 11 approximately uniformly.

Over each row of microwave chips 15 is laid a flat optical ribbon cable 30 containing a plurality of optical fibers 31. Signals are sent between the optical fibers 31 and the microwave chips 15 using a photonic interconnect 32 (shown and discussed in more detail with reference to FIG. 9 below) in accordance with the principles of the present invention. Along either edge of each ribbon cable 30 are an electrical power conductor 33 and an electrical ground conductor 34 which are welded or soldered, for example, to a power input 48 and ground 49 in each microwave chip 15 after the flat optical ribbon cable 30 is installed.

Figure 1A:
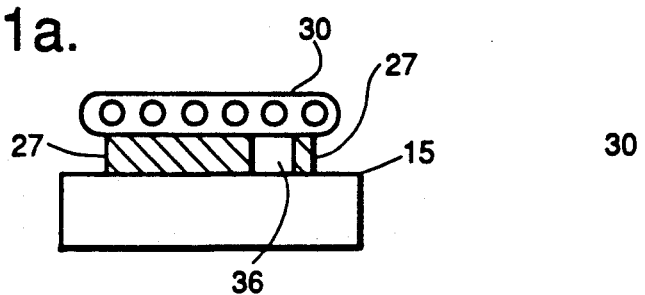
FIG. 1a shows an enlarged view of a portion of FIG. 1.

FIG. 1a shows an enlarged view of a portion of FIG. 1. FIG. 1a shows a portion of the ribbon cable 30 illustrating a window 36 disposed therein that is hidden from view in FIG. 1. The top layer of circuitry on the microwave chip 15 is a metal layer comprising the small microwave antenna 27. This antenna 27 is adapted to transmit and receive microwave radiation through the overlying optical ribbon cable 30, since the cable 30 is made of nonconducting material except for its electrical conductors 33, 34 disposed along its edges. The metal layer comprising the antenna 27 has windows 36 in it where required to permit optical connections to be made to the electrical components of the microwave chips 15.

Figure 4:
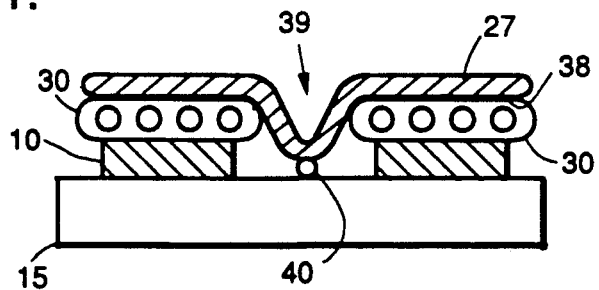
FIG. 4 shows a second embodiment of an antenna configuration for use in the microwave system of FIG. 1.
Figure 5:
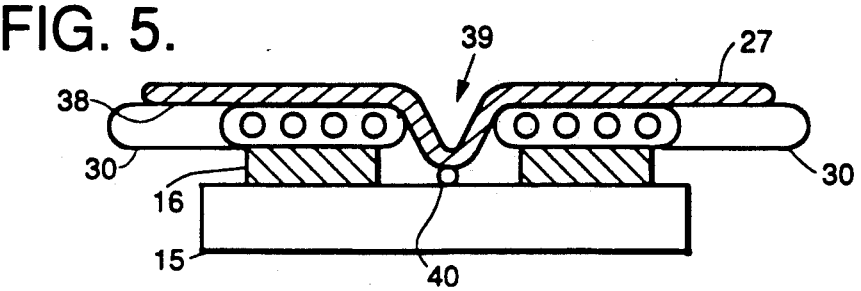
FIG. 5 shows a third embodiment of an antenna configuration for use in the microwave system of FIG. 1 having a relatively large antenna element.
Figure 6:
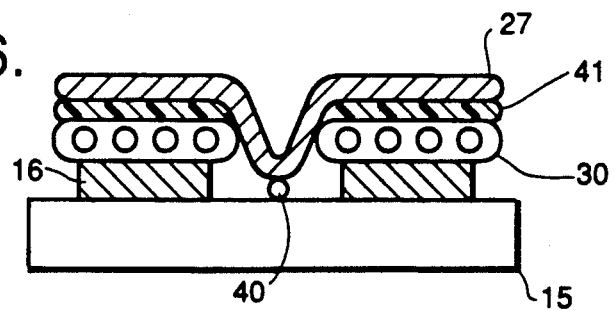
FIG. 6 shows a fourth embodiment of an antenna configuration for use in the microwave system of FIG. 1.
Figure 7:
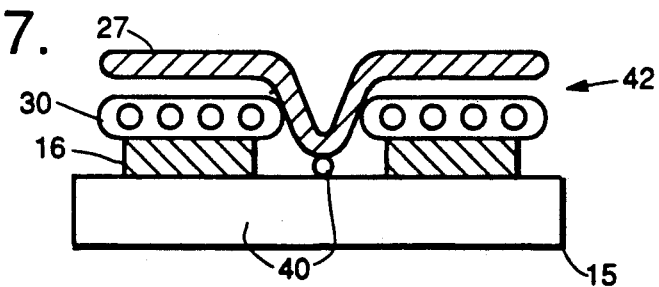
FIG. 7 shows a fifth embodiment of an antenna configuration for use in the microwave system of FIG. 1.

In some instances, applying the metal layer comprising the antenna 27 directly to the microwave chips 15 may lead to parasitic capacitance or inductance which degrades the performance of the antenna 27. In this case, several alternatives may be employed to partially isolate the antenna 27 from the chip 15. FIGS. 4–7 show alternative embodiments of antenna configurations for use in the microwave system 10 of FIG. 1. The metal antenna 27 may be applied to an outer surface 38 of the optical ribbon cable 30, with welded connections to the surface of the microwave chips 15 made through vias 39 in the optical ribbon cable 30, as is shown in FIG. 4. This also allows each antenna 27 to be larger than the electronic chips 15, if desired, as is shown in FIG. 5. The chips 15 may be overlaid with a thick film dielectric material 41 before applying the metal antenna 27, to further isolate the antenna 27 from the chip 15 as is shown in FIG. 6. Alternatively, air bridges or microspring bridges 42 may be used to raise the radiating surfaces comprising the antenna 27 above the top surface of the chips 15, and to separate them from the optical ribbon cable 30, as is shown in FIG. 7.

Figure 8:
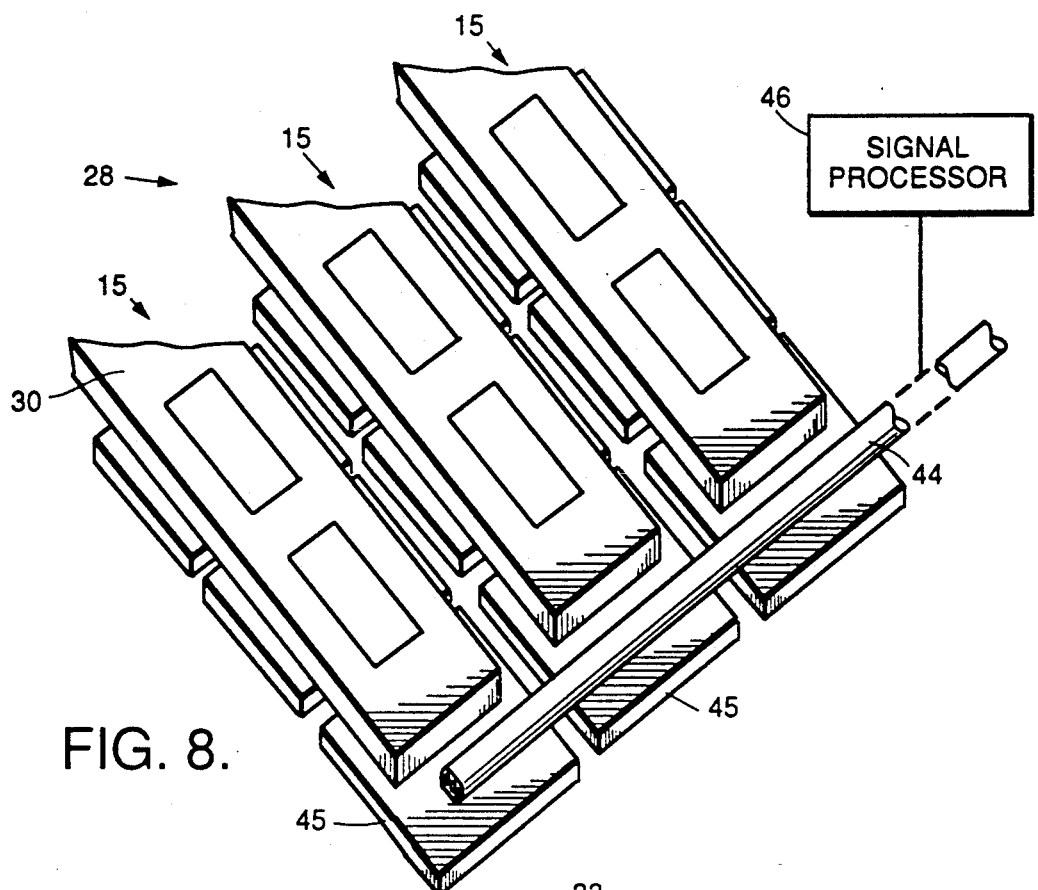
FIG. 8 shows optical cables connecting multiple chips and an optical cable that provides interconnections and phasing between a signal processor and the system of FIG. 1.

At the edges of the array 28 of microwave antennas 27, a second optical cable 44 running at right angles to the rows of microwave chips 15 is provided to permit interconnection and phasing between the rows of chips 15, as is shown in FIG. 8. One of the alternative embodiments shown in FIGS. 4–7 may be employed in the system 10, and one is shown in this figure as an example. Phasing and control chips 45 are coupled to the second optical waveguide 44, and to the optical waveguides 30 to control the phasing of the energy transmitted or received by the array. The second optical cable 44 is coupled to the signal processor 46 that is adapted to process the transmission and reception of the microwave signals by the system 10 in a conventional manner.

Figure 9:
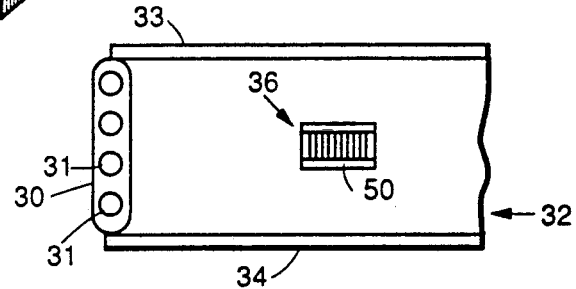
FIG. 9 shows a flat cable having a diffraction grating in the outer surface of one the optical fiber that is used as a photonic interconnect in the system of FIG. 1.

Referring to FIG. 9, the photonic interconnect 32 of the present invention is fabricated as follows. Form a flat optical cable 30 containing a large number of optical fibers 31. Lay this flat cable 31 across multiple electronic chips 15 which are to be interconnected. Where interconnections are desired, open a window 36 in the covering or cladding of the cable 30, exposing an optical fiber 31. Form a diffraction grating 50 in an outer surface of the fiber 31, which is adapted to diffract light into or out of the fiber 31. Align this portion of the cable 31 near one of the following on the surface of the microwave integrated circuit chip 15 (such as is shown in FIG. 3): (1) the optical detector 24, (2) a surface-emitting laser 23, or (3) a similar diffraction grating 50 disposed on the surface of the chip 15, which is connected by an optical waveguide 25 with a laser 23 or detector 24.

The following fabrication techniques may be employed to make the photonic interconnect 32. These techniques are generally well known in the art and will not be discussed in detail herein. The window 36 in the covering of the optical cable 30 may be opened using conventional photolithographic and etching techniques or laser ablation. The diffraction grating 50 in the optical fiber 31 may be formed using a combination of lithography and etching, by focused ion beam milling or implantation, or by illuminating the optical fiber 31 with crossed shorter-wavelength beams to form a diffraction pattern that ablates or damages the optical fiber 31 in a grating pattern. On the electronic chip 15, conventional techniques well-known to those in the integrated optics and signal processing arts are employed to form the lasers 23, detectors 24, optical waveguides 25 and diffraction gratings 50.

Figure 10:
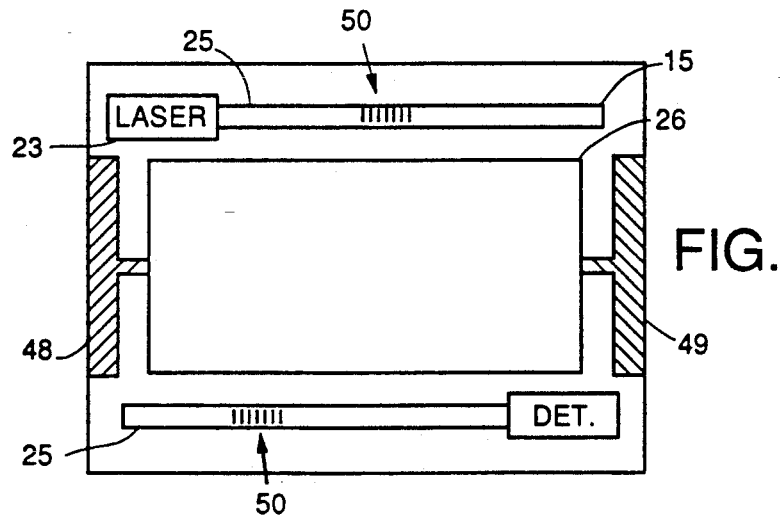
FIG. 10 shows an electronic chip having variable input and output locations that may be employed in the system of FIG. 1.

The following design considerations should be considered in fabricating the system 10 of the present invention. It may be desirable to design the electronic chip 15 so that optical input and optical output through the gratings 50 occur at a variety of locations, such as is shown in FIG. 10, which may be selected by a small number of relatively simple processing steps applied to already-manufactured wafers. In other words, this would provide for a "configurable gate array" version of a photonic chip. This may be done by forming multiple lasers 23 and detectors 24 on the chip 15, with desired ones being electrically connected by a final metallization step. This may also be done using only a few lasers 23 and detectors 24 attached to optical waveguides 25 which traverse the chip 15 as is shown in FIG. 10; these may be connected to an optical fiber 31 of choice by locating a diffraction grating 50 at the appropriate location along a selected optical waveguide 31.

The optical ribbon cable 30 may be enhanced with the following additional features. Electrical conductors may be provided to providing power, ground, control and data signals, for example. Embedded conducting feedthroughs or vias 39 may be used where desired. Alignment marks or notches may also be employed to assist in assembly of the system 10.

The following working example should be helpful. To interconnect microwave chips 15 that are one centimeter square, an optical cable 30 having a width up to one centimeter wide is employed. A one centimeter wide optical cable contain about 500 optical fibers 31 each having a diameter of 10 micrometers, on 20 micrometer centers. The thickness of the optical cable 30 is about 30 micrometers, or 1.2 mils. The required alignment accuracy between the optical cable 30 and microwave chips 15 is approximately equal to the center-to-center spacing of the optical fibers 31, or 20 micrometers in this example. One way to optimize alignment, or to verify proper alignment during assembly, is to send light down the optical fiber 31 and measure reflections from the diffraction grating 50 or other alignment marks on the microwave chips 15.

Thus there has been described new and improved optically phased conformal antennas and photonic interconnects therefor that may be used in such microwave systems. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A microwave system adapted to be disposed on a surface, said system comprising:
   a signal processor;
   at least one microwave integrated circuit chip disposed on the surface that is adapted to process electronic signals and convert the electronic signals into microwave signals or to convert microwave signals into electronic signals;
   an optical ribbon cable disposed on top of the at least one microwave integrated circuit chip that is optically coupled to the chip;
   a microwave antenna disposed on a predetermined surface of the optical ribbon cable that is electrically coupled to the at least one microwave integrated circuit chip.

2. The microwave system of claim 1 wherein the microwave antenna is electrically coupled to the at least one integrated circuit chip by means of a metal weld to the chip through an opening in the optical ribbon cable.

3. The microwave system of claim 1 wherein the microwave integrated circuit chip is disposed on top of the cooling surface using thermally conducting adhesive.

4. The microwave system of claim 1 which further comprises cooling means disposed on the surface, and wherein the at least one microwave integrated circuit chip is disposed on the cooling means.

5. The microwave system of claim 4 which comprises a plurality of microwave integrated circuit chips and wherein the microwave integrated circuit chips are disposed in rows on top of the cooling means.

6. The microwave system of claim 1 which comprises an electrical power conductor, and an electrical ground conductor disposed along respective edges of the ribbon cable.

7. The microwave system of claim 1 wherein the antenna is disposed on an outer surface of the optical ribbon cable, and has welded connections to the surface of the microwave chips made through vias in the optical ribbon cable.

8. The microwave system of claim 7 wherein the antenna is larger than the electronic chips.

9. The microwave system of claim 1 wherein the chips are overlaid with a thick film dielectric material before the antenna is disposed thereon.

10. The microwave system of claim 1 wherein the antennas are raised above a predetermined surface by means of air bridges.

11. The microwave system of claim 1 wherein the antennas are raised above the optical ribbon cable by means of air bridges.

12. The microwave system of claim 11 wherein the integrated circuit chip comprises part of a system that processes microwave radiation.

13. A photonic interconnect comprising an integrated circuit chip having an optical element that is adapted to transmit or receive optical signals, said photonic interconnect comprising:
    an optical cable containing at least one optical fiber disposed on a selected surface of the integrated circuit chip, the flat optical cable having an opening in its outer covering that exposes at least one optical fiber;
    a diffraction grating formed in an outer surface of the exposed optical fiber that is adapted to diffract light into or out of the fiber, and wherein the diffraction grating is substantially aligned with the optical element to permit the transference of optical signals between the optical cable and the integrated circuit chip.

14. A method of fabricating a photonic interconnect comprising the steps of:
    forming a flat cable containing a predetermined number of optical fibers;
    opening a window in the covering of the cable to expose an optical fiber where interconnections are to be made;
    forming a diffraction grating in an outer surface of the exposed optical fiber which is adapted to diffract light into or out of the fiber.

15. A method of interconnecting a microwave system comprising a microwave integrated circuit chip having an optical element that is adapted to transmit or receive optical signals to an external signal processor, said method comprising the steps of:
    forming a photonic interconnect comprising a cable containing a predetermined number of optical fibers;
    opening a window in the covering of the cable to expose an optical fiber where interconnections are to be made;
    forming a diffraction grating in an outer surface of the exposed optical fiber which is adapted to diffract light into or out of the fiber;
    laying the photonic interconnect across the microwave integrated circuit chip to which the external signal processor is to be interconnected; and
    aligning the exposed optical fiber near the optical element to provide for coupling of optical signals between the signal processor and the microwave integrated circuit chip.

16. The method of claims 15 wherein the step of aligning the exposed optical fiber comprises the step of aligning the exposed optical fiber with an optical detector contained in a microwave integrated circuit chip.

17. The method of claims 15 wherein the step of aligning the exposed optical fiber comprises the step of aligning the exposed optical fiber with a surface-emitting laser diode contained in a microwave integrated circuit chip.

18. The method of claim 15 wherein the step of aligning the exposed optical fiber comprises the step of aligning the exposed optical fiber with a diffraction grating disposed on the surface of the electronic chip, which connects with an optical device on the chip.

* * * * *